Oct. 24, 1967  J. L. CROWDER ETAL  3,348,790
MAINTENANCE OF TEMPERATURE CONDITIONS IN SATELLITES
Filed June 4, 1965  3 Sheets-Sheet 1
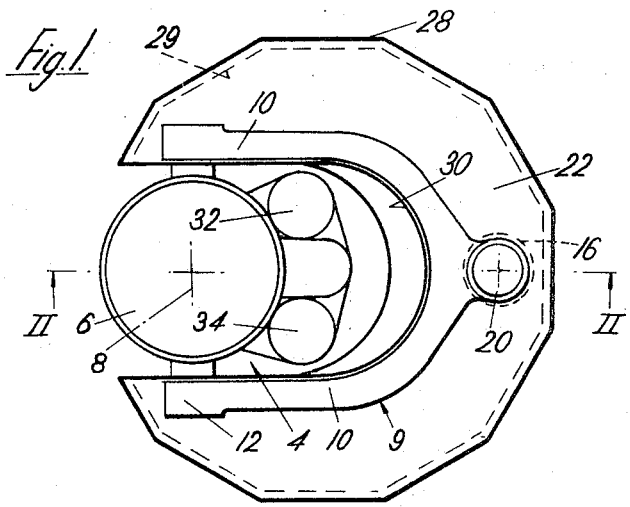
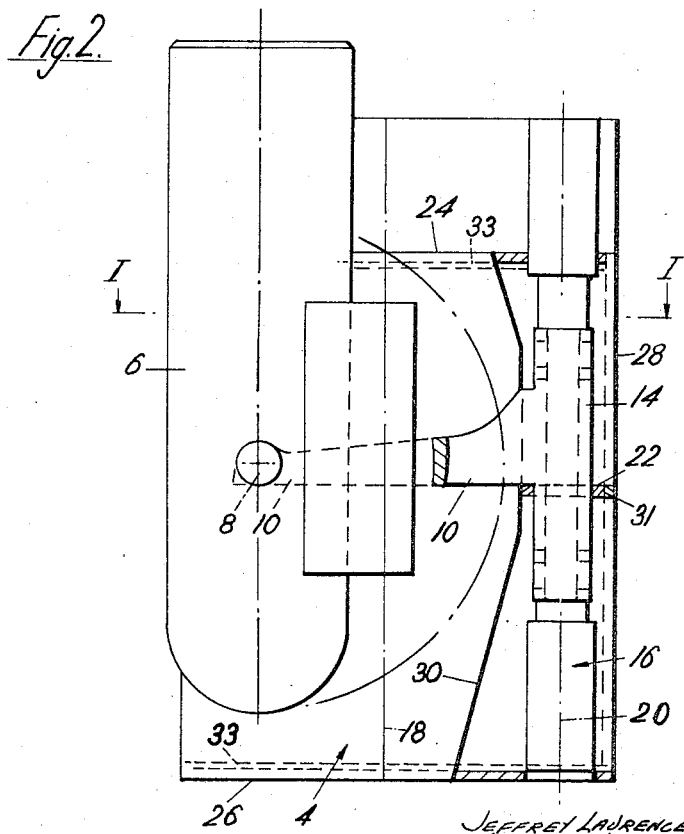
Inventors
JEFFREY LAURENCE CROWDER
WILLIAM HAROLD DURRANT
By
Bailey, Stephens & Huettig
Attorneys Oct. 24, 1967 J. L. CROWDER ETAL 3,348,790
MAINTENANCE OF TEMPERATURE CONDITIONS IN SATELLITES
Filed June 4, 1965 3 Sheets-Sheet 2
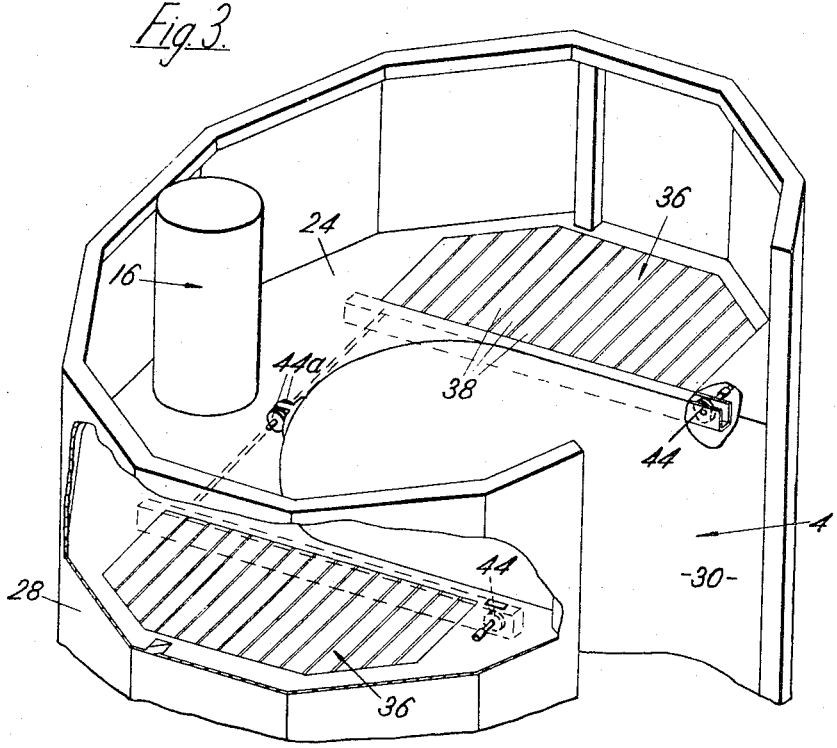
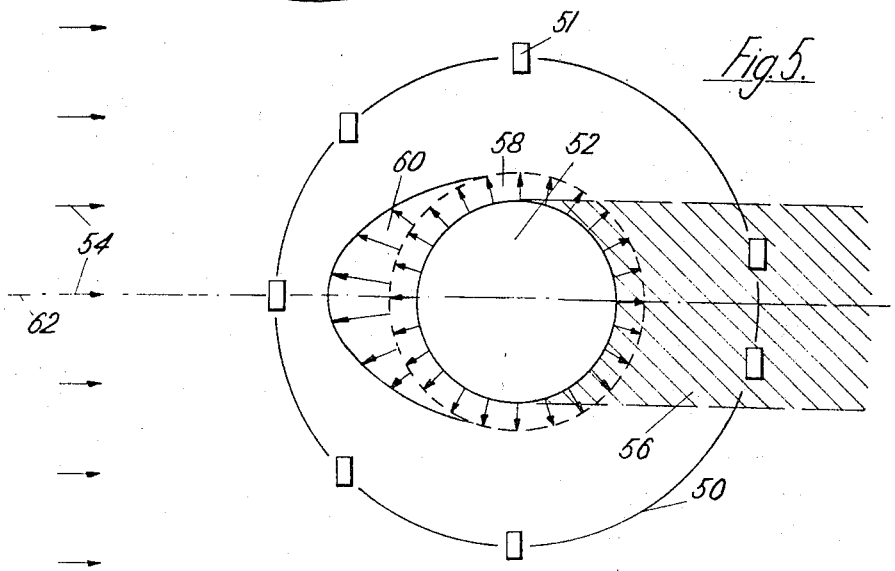
Inventors
JEFFREY LAURENCE CROWDER
WILLIAM HAROLD DURRANT
By
Bailey, Stephens v Huettig
Attorneys

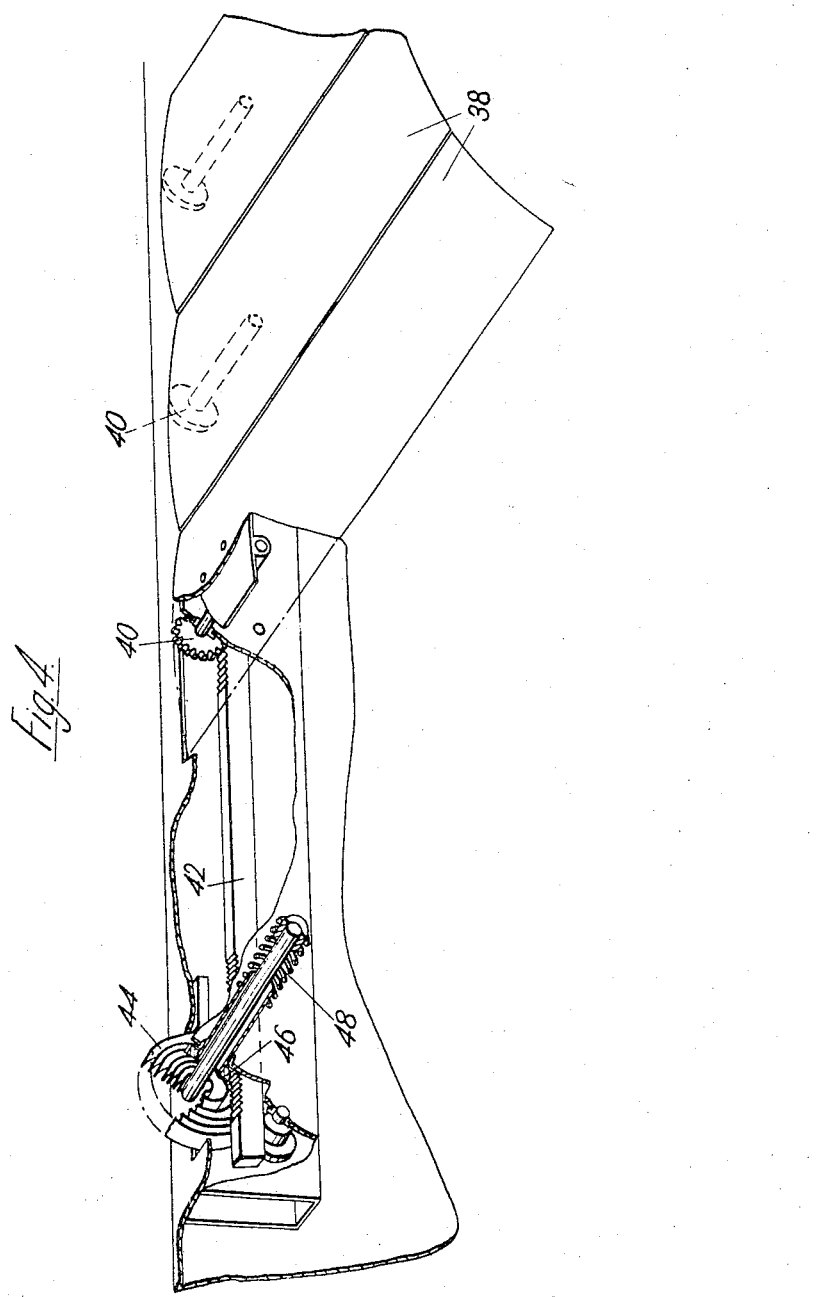

United States Patent Office

3,348,790
Patented Oct. 24, 1967

3,348,790
MAINTENANCE OF TEMPERATURE CONDITIONS IN SATELLITES
Jeffrey L. Crowder, Wheathamstead, and William H. Durrant, Welwyn, England, assignors to British Aircraft Corporation (Operating) Limited, London, England, a company of Great Britain
Filed June 4, 1965, Ser. No. 461,443
Claims priority, application Great Britain, June 5, 1964, 23,433/64
5 Claims. (Cl. 244—1)

ABSTRACT OF THE DISCLOSURE

In a cylindrical earth satellite maintained with its axis perpendicular to the ecliptic, preferably with a telescope housed in a trough facing away from the sun, the cylindrical surface is well insulated thermally, while the end surfaces are insulated, but less well, and the end insulation is adjusted by means responsive to internal temperature, preferably by a series of tiltable vanes.

---

This invention has been made in connection with the development of a space-stabilised satellite to carry a telescope, or other directional instrument, for making astronomical observations. The satellite while orbiting the earth is maintained in a constant attitude with reference to the plane of the ecliptic. The shape selected for the exterior is substantially cylindrical (in fact a twelve-sided prism), and control mechanism serves to maintain the axis of the cylinder perpendicular to the ecliptic, and to maintain the rotational attitude of the satellite about that axis in relation to space. It is convenient to refer to one of the ends of the cylinder as the "top" of the satellite. In one side of the satellite body there is a deep trough in which is housed the telescope. The telescope is aligned on a desired object by movements in "elevation" and in "azimuth." For "elevation" it is tilted relatively to the body of the satellite about an axis which is perpendicular to, and somewhat offset from, the axis of the body. For "azimuth" the entire satellite is turned about the axis of the body, and then maintained in a fresh rotational position.

For accuracy of performance, it is desirable that the telescope should operate at a substantially uniform temperature.

According to the present invention the cylindrical surface of the body is well insulated thermally so that substantially no radiant heat from the sun reaches the interior of the satellite, and the ends of the body are also thermally insulated, but less well, this insulation of the ends being adjustable by means responsive to temperature within the body. The significance of these features will be explained with reference to the example shown in the accompanying drawings, which serve also to illustrate various preferred details of construction. In these drawings:

FIGURE 1 is a "horizontal" section of the satellite, on the line I—I in FIGURE 2;

FIGURE 2 is a longitudinal section on the line II—II in FIGURE 1;

FIGURE 3 is a perspective view of the exterior of the "upper" part of the body of the satellite;

FIGURE 4 is a fragmentary perspective view of part of shutter mechanism; and

FIGURE 5 is a diagram of the orbit of the satellite.

The body of the satellite is substantially cylindrical, having in fact the external form of a twelve-sided prism, with a deep trough 4 in one side, in which lies the telescope 6. The telescope can be swung relatively to the body about an axis 8, through an angle of a little more than 180°.

The principal structural member of the body is a rigid wishbone 9 consisting of two arms 10 which support bearings 12 for the telescope, and a sleeve 14 in which is journalled a starlock unit 16. This unit 16 is a rigid shaft supporting several starlock telescopes aligned in different directions with respect to the shaft. A starlock telescope is a device which receives illumination from a small angular field and directs it to a photomultiplier. Within the optical system there is a mask, consisting of alternate opaque and transparent sectors, and an image of the field, formed in the plane of the mask, is caused to perform a nutating motion by means of a nutating lens between the objective and the stop. Thus the image of each star in the field is "scanned" by the mask. The output signal of the photomultiplier is a waveform which is determined by the brightness and positions of the stars in the field. Any deviation of the alignment of the starlock telescope in space will cause the stars to shift in the field and so alter the waveform. The waveform can be compared with that which would be produced were the starlock telescope correctly aligned, and a signal derived indicating the extent and direction of any error.

When the satellite is in orbit, the attitude of the body can be controlled, by rotation of inertia wheels, or by ejecting jets of gas, so as to maintain the starlock unit in a fixed attitude in space. That is to say, the satellite is brought to approximately the correct attitude by reference to a gyroscopic device, and any minor error then revealed by the starlock telescopes is thereupon eliminated. Thereafter any incipient error revealed by the starlock telescopes is corrected. The starlock telescopes are not illustrated, as they are not part of the present invention.

In this particular example, the starlock unit is kept perpendicular to the ecliptic, and rotationally stationary about its own axis. In order to align the telescope 6 on a desired object, it is moved in "elevation" by tilting the telescope relatively to the body about the axis 8; and is moved in "azimuth" by rotating the body around its longitudinal axis 18, while rotating the starlock unit relatively to the body about its axis 20, through an equal and opposite angle.

To the wishbone 9 is secured a bulkhead 22, of horseshoe shape, on which is mounted various equipment, not shown. The body has end walls 24 and 26, also of horseshoe shape, an outer wall 28, and a trough lining 30. Much of the exterior of the outer wall 28 is covered with flat solar cell units, not shown, for providing energy to operate the equipment in the satellite.

The main telescope 6 is for ultra-violet spectrographic observations. Mounted parallel to it are an X-ray spectrometer 32 and an additional star reference device 34.

The desired accuracy of pointing of the telescope is within 1 minute of arc. To attain this, it is desirable that the telescope itself should operate at a substantially uniform temperature, and the same is true of the wishbone 9. Furthermore, it is desirable that the temperatures of these components when the satellite is in orbit should not be greatly different from those prevailing during preparation and testing on the ground.

As shown in FIGURE 5, the orbit 50 of the satellite 51 is polar in relation to the earth 52. A number of successive positions of the satellite are shown. The control mechanism includes means which limits the extent of rotation of the body in azimuth so that the trough 4 is never exposed to the sun. That is to say the telescope receives radiant heat only from the body and, to a small extent, from the earth. Infra-red radiation from the earth is indicated at 58, and reflection of light at 60.

The satellite is intended to remain in orbit for a year or more. The inclination and altitude of the orbit are such that the orbital plane precesses in such a manner as to pass through the sun at all times. The direction of the sun's rays is indicated at 54, and the plane of the ecliptic is indicated at 62. Thus during a part of each orbit the satellite is in the earth's shadow 56. This gives favourable conditions for telescopic observation, but means that the radiation reaching the body fluctuates widely during each orbit.

Heat balance problems on this satellite are particularly acute because, (1) Some components of the experiments, for example the telescope mirrors, require quite rigid control not only of average temperature but also of the magnitudes of temperature gradients.

(2) Since the satellite is stabilised in space, temperature gradients across the satellite are liable to be severe by comparison with those experienced by spinning satellites.

(3) The relatively low orbit altitude introduces long periods of darkness, thus accentuating the fluctuation of temperature with time during a given orbit as the flux from the sun and the earth's albedo is periodically interrupted.

There are three principal sources of heat input, (a) The sun,
(b) The earth,
(c) Internal components.

Direct sunlight is the principal source of heat flux, but intermittent, and its source is confined to a plane normal to the longitudinal axis of the satellite.

Reflected sunlight from the earth is the next major component, and the intensity of this varies with orbit position, as does the projected area of the satellite relative to the earth. Infra-red radiation from the earth is not a major problem, since both earth and satellite are at about the same temperature.

Internally generated heat is not a major problem.

The telescope and spectrometer temperature should be close to room temperature, to avoid too great a transition between ground test and orbit temperatures. The temperature gradients through the main mirror of the telescope should not exceed:—

(a) Through the thickness—10° C.
(b) Across a diameter—5° C.

The basic philosophy adopted in this design, so as to minimise gradients and to control average temperatures to acceptable values, is to enclose as much of the satellite as possible, the external secondary structure being, in effect, a thermal box. To minimise the effect of the sun the inside of the circular periphery is heavily insulated. This eliminates the temperature gradients which would inevitably arise due to one face being illuminated by the sun, while the opposite face at best is heated by the weaker earth source. Further, without such insulation, the gradients would fluctuate as the satellite passed into and out of the earth's shadow.

The end faces, viewing free space, and acting as radiators, are partly insulated to control the average temperature to the required value. Active heat balance units mounted on the upper end face also assist this control.

The trough, in which the telescope is mounted, effectively surrounds this, and thus its temperature basically governs the telescope temperature. Its temperature approaches the average temperature of the satellite (room temperature).

The wishbone forging, which carries the telescope relative to the star reference system, is sensitive to thermal distortions. It is lagged to reduce radiation input, and the main bulkhead, to which it is attached, is insulated from the external skin to eliminate variable heat input by conduction.

Typical temperatures which arise with this arrangement are:

(1) Satellite body: Mean value between 20° C. and 50° C. depending upon degree of insulation, but fluctuations are less than this range.

(2) Telescope: Some 20° C. below satellite body.

(3) Solar cells: During one orbit fluctuating between +85° C. and −10° C. on sun facing side, and −30° C. to −80° C. on the opposite side.

The outer wall 28 of the body is well insulated thermally so that substantially no heat from outside reaches the interior of the body. That is to say that the inner face of the wall emits substantially no radiant heat, and the junctions of the wall with bulkheads and other internal members transmit substantially no heat to conduction. To achieve this, the outer wall is faced internally with a material known as aluminised "Mylar." "Mylar" is the trade name for a polyester film made by E. I. du Pont de Nemours & Co. It can be coated on one surface with a thin layer of aluminium. The resultant material is a highly effiicent reflective insulant and has extremely low mass. The latter property is important, as the total weight of the satellite is severely limited by launching considerations. The wall 28 may consist of a framework to the inner face of which the insulation is secured. There may be several layers, as required to produce adequate insulation, and they may be flat or crinkled. The general location of this insulation is indicated at 29 in FIGURE 1. In addition, the bulkhead 22, which is of metal honeycomb sandwich, has a strip of polytetrafluoroethylene around its horseshoe shaped outer periphery at 31. This has a very low thermal conductivity.

It is a corollary of the insulation of the outer wall 28 that substantially no heat is radiated outwards from the outer wall into space. Heat generated within the interior of the body, as a result of conversion of electrical energy into mechanical power to operate controls, is dissipated through the ends of the body which are less well insulated than the outer wall 28.

These end walls 24 and 26, which are of swaged magnesium sheet, also have an internal facing of aluminised Mylar indicated at 33.

In order to control the rate of heat dissipation, and hence maintain substantially constant the mean temperature within the body, the top wall 24 includes two radiation openings 36, which communicate with the interior of the body and which are shrouded to a variable extent by a movable blind consisting of a series of tiltable vanes 38, which may be of aluminum alloy. These vanes, see FIGURE 4, are coupled by pinions 40, a common rack bar 42 and a pinion 46 to a sensor consisting of a spiral bi-metal element 44. This element is in a casing fixed to the trough wall, and thus is close to the temperature of the telescope. An alternative position for two sensors mounted close together is shown at 44a in FIGURE 3. Upon change of temperature, the sensor turns the pinion 46 and hence tilts the vanes.

During preparation and launching, a satellite may undergo thermal conditions more extreme than those experienced when in orbit. To allow for this, the spiral element may be coupled to the pinion 46 via a spring 48 which permits lost motion between the spiral element and the vanes, while the vanes are limited to an angular movement of 90° between "open" and "closed."

The outer wall 28 extends "above" the top wall 24, so as to ensure that radiation from the sun does not interfere with the bi-metal members 44 registering the mean internal temperature of the body.

In order to attain a desirable distribution of heat among the components of the satellite, one or more of the following features may be used. The trough lining 30 may include insulation. The telescope 6 may be wholly or partly enclosed in insulation. The wishbone 9 may be wholly or partly enclosed in insulation. The wishbone may be locally heated electrically, with energy derived from batteries charged by the solar cells, so as to maintain a desirable pattern of heat distribution. The components within the body may be so shaped and placed that there are clear paths for heat to be transferred by radiation between the components.

The invention may be applied to space-stabilised satellites which are used in other types of orbit, e.g., equatorial or ecliptical, provided that the axis of the cylindrical surface is maintained perpendicular to the plane of the ecliptic.

We claim:

1. In a satellite having a substantially cylindrical body, and means for maintaining the axis of the body perpendicular to the ecliptic while the satellite is in orbit, the improvements comprising a cylindrical surface of the body well insulated thermally so that substantially no radiant heat from the sun reaches the interior of the satellite, and ends of the body also thermally insulated, but less well, this insulation of the ends being adjustable by means responsive to temperature within the body.

2. A satellite according to claim 1, in which there is a trough in one side of the body, and a telescope within the trough.

3. A satellite according to claim 1, in which one or more end areas of the body are shrouded to a variable extent by a movable blind controlled by the means responsive to temperature.

4. A satellite according to claim 3, in which each blind consists of a series of tiltable vanes.

5. A satellite according to claim 4, in which the vanes are coupled by pinions and a common rack bar to a control consisting of a spiral bi-metal member.

References Cited

UNITED STATES PATENTS 3,258,225  6/1966  Esch et al. _____ 244—1
3,270,908  9/1966  Faget et al. _____ 244—1 X FERGUS S. MIDDLETON, *Primary Examiner.*